Patented Sept. 23, 1947

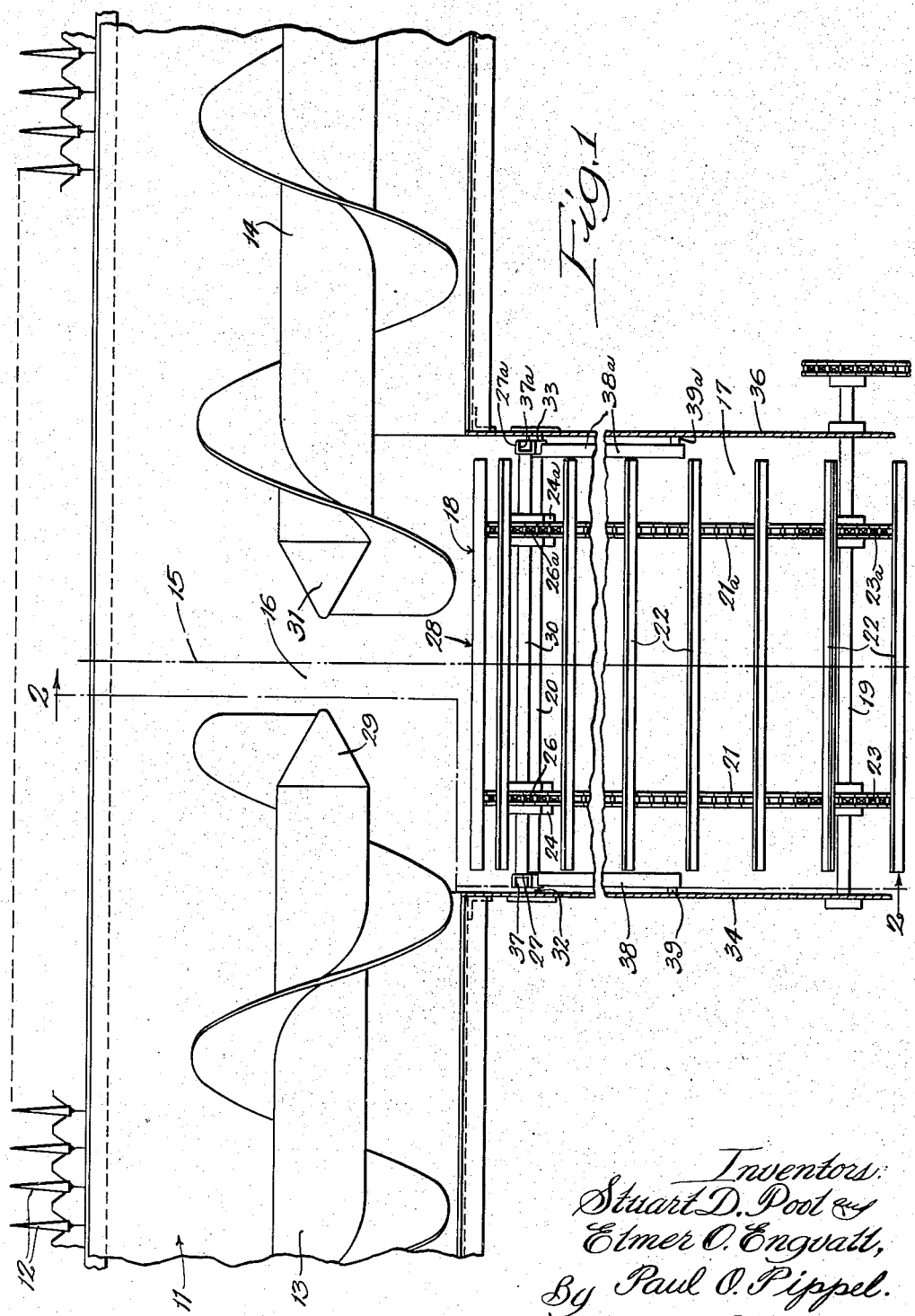

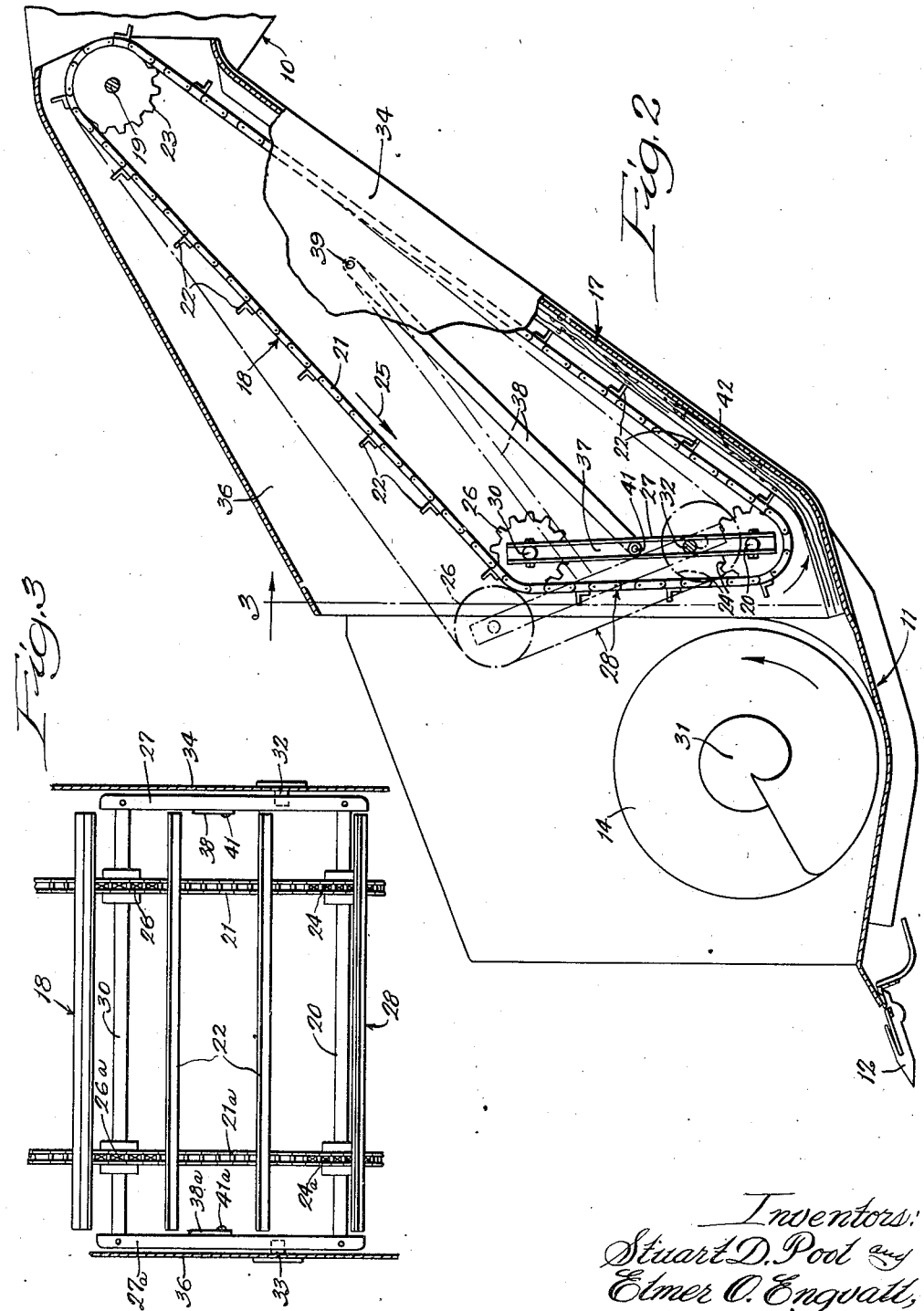

2,427,876

UNITED STATES PATENT OFFICE 2,427,876

CONVEYER MECHANISM FOR HARVESTER THRESHERS

Stuart D. Pool and Elmer O. Engvall, Moline, Ill., assignors to International Harvester Company, a corporation of New Jersey Application July 26, 1943, Serial No. 496,168

14 Claims. (Cl. 198—104)

1

This invention relates to a new and improved harvester thresher and has for one of its principal objects the provision of a novel feeding device for transporting cut grain from the harvester to the thresher.

An important object of this invention is to provide a novel grain-feeding device adapted to be applied to grain harvesting devices and particularly suited for receiving grain being fed thereto by an auger.

Harvester threshers of the relatively wide cutting type have employed conveying means transversely to the line of cut so that the auxiliary conveyer to the threshing units is not necessarily as wide as the width of the grain being cut. The platform conveyers have been of several types such as a slatted canvas conveyer or auger conveyers, as used in the present invention, either in one or two parts feeding to one side or to the center, respectively. The auxiliary conveyer receiving the cut grain from the transverse conveyer has generally been of the slatted canvas type positioned along the floor of an incline and having the grain ride upwardly thereon. Often times, devices have been employed to compress the grain against this upwardly moving conveyer so as to insure the grain moving upwardly. These devices employed on top of the inclined conveyer generally have taken the form of another conveyer positioned hingedly thereabove so that greater or lesser amounts of cut grain may be accommodated.

It is, therefore, an object of the present invention to supply an operative auxiliary conveyer which eliminates the usual upwardly moving base or floor conveyer and merely employs an upper conveyer, preferably of the angle iron type, wherein the grain received from the transverse platform conveyer is compressed between the angle irons and the inclined base so that the grain is carried up the incline and to the threshing unit.

It is a further object of this invention to provide a longitudinal conveyer for harvester threshers which is adapted to receive cut grain from the harvester and, more particularly, to receive grain cut by the harvester and transported transversely thereof by a harvester platform rotary conveyer. The longitudinal conveyer is further designed to have a substantial vertical forward end which maintains a constant relationship with the transverse harvester platform conveyer regardless of the amount of cut grain being transported to the thresher unit.

Another and further important object of this

2 invention is to provide an upwardly moving conveyer of the slatted type having a relatively wide forward end and adapted to receive grain or the like from transversely moving auger conveyers.

The upwardly slatted conveyer is hinged at its upper end and thereby accommodates any quantity of grain being fed up the incline, and upon raising of the conveyer upon greater amounts of grain being fed therein, the wide forward end automatically maintains a constant position relative to the transverse auger conveyers.

Other and further important objects of this invention will become apparent from the following detailed description and accompanying drawings, in which:

Figure 1 is a top plan view partially in section of a portion of a harvester thresher;

Figure 2 is a sectional view taken on the line 2—2 of Figure 1; and

Figure 3 is a sectional view taken on the line 3 of Figure 2.

As shown in the drawings, the reference numeral 11 indicates generally a platform of a harvester thresher having a usual cutter-bar 12 at the forward end thereof and having a pair of opposed rotary augers 13 and 14. These augers are adapted to transversely feed the grain cut by the cutter-bar 12 to a central portion 16 of the platform, at which point the cut grain is transported rearwardly up an incline 17 as best shown in Figure 2. The grain upon reaching the upper end of this incline 17 is fed into the threshing unit 10 the forward end of this unit being the only part shown.

The means for taking grain up the incline 17 forms a novel part of this invention. As will be seen in Figure 2, the base 17a of the incline 17 is made of a sheet of metal above which rides a conveyer 18 of the undershot type hinged at its upper end about a transverse shaft 19 so that the lower end of the conveyer 18 may raise or lower in its relation to the base of the incline 17 depending on the amount of grain to be elevated thereby. The conveyer 18 consists of a pair of laterally spaced apart chains 21 and 21a having angle irons or lag bars 22 extending thereacross at substantially regular intervals. The chains 21 and 21a are trained around upper sprockets 23 and 23a, which are supported on the shaft 19, and pairs of lower sprockets 24 and 24a and 26 and 26a on shafts 20 and 30, respectively. The conveyer 18 is driven in a counter-clockwise direction as viewed in Figure 2 and designated by the arrow 25. The lower sprockets 24 and 24a and 26 and 26a are fixedly spaced apart by channel beams 27 and 27ª which in normal position of the undershot conveyer 18 hold the sprockets 26 and 26ª directly above the sprockets 24 and 24ª, as shown in the full lines of Figure 2. The conveyer 18, therefore, has a substantially wide vertical forward end 28 defined by the sprockets 24 and 24ª and 26 and 26ª.

It will be seen, therefore, that the forward end 28 of the conveyer 18 is so positioned with respect to open delivery ends 29 and 31 of the opposed augers 13 and 14, respectively, that the grain delivered by these augers is carried up the incline 17 by means of the conveyor 18 compressing the grain by means of the angle irons 22 on the incline 17. It will be further noticed that this forward end 28 of the undershot conveyer 18 is substantially greater in height than the diameter of the augers 13 and 14, and that the open ends 29 and 31 of the augers closely approach the median line 15 of the conveyer 18. This latter condition creates a considerable overlapping of the augers 13 and 14 by the undershot conveyer 18. It is immaterial whether the grain cut by the cutter-bar 12 and dropped on the platform 11 is carried on the under side of the augers 13 and 14, or whether the grain is of the long type and is tedded along the tops of the augers 13 and 14, because the forward end 28 of the conveyer 18 will receive grain from the top or bottom of the augers. Ordinarily, with this type of construction, the hinged conveyer 18 upon rising with an increase of cut grain being elevated on the incline 17 would move the sprockets 24 and 24ª closer to the augers 13 and 14, and the sprockets 26 and 26ª would increase their distance from the augers 13 and 14. However, such movement of the sprockets 24 and 24ª and 26 and 26ª would not prove acceptable, for the reason that if the sprockets 26 and 26ª move away from the augers 13 and 14, the forward end 28 of the conveyer 18 would entirely lose its effectiveness, and especially grain coming in on the tops of the augers 13 and 14 would be lost and would have a tendency to fall back off the platform 11 and beneath the forwardly moving harvester thresher machine. Such normal shifting of the sprockets 24 and 24ª and 26 and 26ª is prohibited by a pair of guide pins 32 and 33 rigidly mounted on side sheets 34 and 36, respectively, of the incline 17 and having their inner ends slidably engaging channels 37 and 37ª in the channel beams 27 and 27ª. Arms or links 38 and 38ª, as best shown in Figure 2, are pivotally mounted on the inner sides of the side sheets 34 and 36 respectively at 39 and 39ª, and at their other ends are pivoted at 41 and 41ª on the channel beams 27 and 27ª.

Figure 2 shows cut grain 42 being elevated on the incline 17 by means of the angle irons 22. The amount of grain shown is probably the normal or average amount of grain, but the conveyer 18 is capable of elevating much greater quantities of grain than are shown, and there are times when such quantities of grain are entering the harvester thresher. Assuming that the quantity of grain cut rises, the conveyer 18 will swing upwardly about the shaft 19, and in so doing the lower end of the conveyer outlined by the sprockets 24 and 24ª and 26 and 26ª will assume the position in dashed lines, wherein the forward end 28 of the conveyer 18 is now inclined at some forward angle depending on the amount of grain being elevated and the upper forward end thereof extends to a position vertically over the augers 13 and 14. This forward inclined movement of the end of the conveyer 28 is occasioned by the limiting of the lower ends of the channel beams 27 and 28ª to substantial vertical movement by reason of the guide pins 32 and 33, and the upper ends including the sprockets 26 and 26ª are forced forwardly by reason of the constant length connecting links 38 and 38ª, which prohibit rearward movement of the upper portions of the channel beams 27 and 27ª and cause the forward movement thereof.

The position assumed by the conveyer 18, as shown in the dashed lines of Figure 2, more readily receives grain being cut by the cutter-bar 12 and fed transversely by the augers 13 and 14 and tends to prevent loss of any of the cut grain. It will be noticed that the forward end 28 of the conveyer 18 maintains a relatively constant relationship with respect to the augers 13 and 14. This high vertical face 28 of the feeder chain 18 has an additional advantage when very long straw grain is fed into the feeder. This grain does not pass under the feeder but, as previously stated, is tedded along by the worms until the heads of the grain lying over the worm strike the vertical face 28 of the feeder chain 18. At this point the conveyer 18 doubles the grain down and pulls it in over the worms 13 and 14 or through the space between them, as shown at 16, instead of feeding underneath the augers 13 and 14.

The intention is to limit the invention only to the scope of the appended claims.

What is claimed is:

1. An elevating device for harvester threshers, in combination with a transverse grain-feeding auger, comprising an incline at the rear of said auger, a hanging chain-type slatted conveyer on said incline hingedly mounted at the upper end thereof, the lower end of said conveyer defined by pairs of vertically spaced apart sprockets, whereby the substantially vertical face formed by the spaced apart sprockets is adapted to receive grain from the transverse auger conveyer whether it be fed beneath the auger or along the top thereof.

2. An elevating device for harvester threshers, in combination with a transverse grain-feeding auger, comprising a flat incline at the rear of said auger, a hanging chain-type slatted conveyer on said incline hingedly mounted at the upper end thereof, the lower end of said conveyer defined by a pair of vertically spaced apart sprockets, whereby the front face formed by the spaced apart sprockets is adapted to receive grain from the transverse auger conveyer whether it be fed beneath the auger or along the top thereof, and means for automatically maintaining said front face of the hanging conveyer in substantially uniform spaced relationship with respect to said transverse auger regardless of the amount of grain being fed up the incline.

3. An elevating device for harvester threshers, in combination with a transverse grain-feeding auger, comprising a flat incline at the rear of said auger, a hanging chain-type slatted conveyer on said incline hingedly mounted at the upper end thereof, the lower end of said conveyer defined by a pair of vertically spaced apart sprockets, whereby the face formed by the spaced apart sprockets is adapted to receive grain from the transverse auger conveyer whether it be fed beneath the auger or along the top thereof, and means for maintaining said face of the hanging conveyer in uniform spaced relationship with respect to said transverse auger regardless of the amount of grain being fed up the incline and the height of the conveyer above the incline, said means comprising a channelled beam adjoining said vertically spaced apart sprockets, a stationary pin slidably engaging the channelled beam at a point relatively close to the lower pair of said sprockets, a pivotal connecting link stationarily pivoted with respect to said elevator and pivotally attached at its opposite end to said channelled beam at a point above the position of said pin whereby upon feeding of more grain to the incline the hanging conveyer will have its lower feed sprocket rise substantially vertically and its upper sprocket project relatively forwardly so as to partially superimpose the transverse auger.

4. An elevator hingedly cooperating with a fixed incline having side walls, a shaft journaled in the upper end of said side walls about which the elevator is hinged, a pair of fixedly spaced apart shafts positioned between said side walls, a pair of channelled beams adjoining said pair of shafts, pairs of sprockets on each of said shafts, a pair of chains around said sprockets, lag bars positioned across said sprockets at intervals around their periphery, and means cooperating with said channelled beams for causing the beams to shift from a substantially vertical position to a forwardly inclined position upon the elevator swinging upwardly about its hinge away from the fixed incline.

5. An elevator hingedly cooperating with a fixed incline having side walls, a shaft journaled in the upper end of said side walls about which the elevator is hinged, a pair of fixedly spaced apart shafts positioned between said side walls, a pair of channelled beams adjoining said pair of shafts, pairs of sprockets on each of said shafts, a pair of chains around said sprockets, angle irons positioned across said chains at intervals around their periphery, and means cooperating with said channelled beams for causing the beams to shift from a substantially vertical position to a forwardly inclined position upon the elevator swinging upwardly about its hinge away from the fixed incline, said means comprising pins fixedly positioned on said side walls and adapted to project inwardly and slidingly engage said channelled beams.

6. An elevator hingedly cooperating with a fixed incline having side walls, a shaft journaled in the upper end of said side walls about which the elevator is hinged, a pair of fixedly spaced apart shafts positioned between said side walls, a pair of channelled beams adjoining said pair of shafts, a pair of sprockets on each of said shafts, a pair of chains around said sprockets, angle irons positioned across said chains at intervals around their periphery, and means cooperating with said channelled beams for causing them to shift from a substantially vertical position to a forwardly inclined position upon the elevator swinging upwardly about its hinge away from the fixed incline, said means comprising pins fixedly positioned on said side walls and adapted to project inwardly and slidingly engage said channelled beams, said pins placed so they engage only the lower halves of the channelled beams.

7. An elevator hingedly cooperating with a fixed incline having side walls, a shaft journaled in the upper end of said side walls about which the elevator is hinged, a pair of fixedly spaced apart shafts positioned between said side walls, a pair of channelled beams adjoining said pair of shafts, pairs of sprockets on each of said shafts, a pair of chains around said sprockets, angle irons positioned across said chains at intervals around their periphery, means cooperating with said channelled beams for causing them to shift from a substantially vertical position to a forwardly inclined position upon the elevator swinging upwardly about its hinge away from the fixed incline, said means comprising pins fixedly positioned on said side walls and adapted to project inwardly and slidingly engage said channelled beams, said pins placed so they engage only the lower halves of the channelled beams, and a pair of connecting links pivotally mounted at one of their ends on said side walls and at their outer ends pivotally connected to said channelled beams at some points above the engagement of said pins.

8. A harvesting implement having a frame, a transversely feeding rotary conveyer, a second conveyer hinged at its upper end and placed generally perpendicular to said rotary conveyer and closely adjacent the end thereof, said second conveyer comprising a substantially vertical forward end, and means for maintaining said forward end in a constant spaced apart relationship with said rotary conveyer during all positions it assumes as the second conveyor moves about its hinged upper end.

9. A harvesting implement having a frame, a transversely feeding rotary conveyer, a second conveyer placed perpendicular to said rotary conveyer and closely adjacent the end thereof, said second conveyer comprising a substantially vertical forward end, means for maintaining said forward end in a constant spaced apart relationship with said rotary conveyer, said means comprising a spacer beam having a channel extending longitudinally thereof, a pin fixedly mounted in said frame and slidably engaging said channel, and a connecting link pivotally mounted intermediate the frame and the beam at a point above the sliding range of the pin.

10. A harvester having a transversely feeding rotary conveyer, a longitudinally feeding conveyer beginning at the discharge end of said rotary conveyer, said longitudinal conveyer being of the slatted chain type and adapted to convey by compression, said longitudinal conveyer having a vertically extended forward face, automatic means for inclining said face at various angles with respect to the transversely feeding rotary conveyer depending on the quantity of grain being fed therethrough, said automatic means comprising a pin slidably cooperating with the lower half of a channelled beam, and a spacer link pivotally attached to said channelled beam above said pin engagement.

11. In a harvester having a transverse platform, an auger conveyer disposed thereabove to move cut crops therealong, an elevator housing positioned adjacent the discharge end of the auger conveyer, and an undershot endless conveyer hinged on said elevator housing having a vertically extended forward portion disposed closely adjacent the discharge end of the auger conveyer to pull crop material therefrom, the discharge end of the auger conveyer extending substantially past the proximate marginal edge of the extended forward portion of the endless conveyer.

12. In a harvester having a transverse platform, an auger conveyer disposed thereabove to move cut crops therealong, an elevator housing positioned adjacent the discharge end of the auger conveyer, said auger conveyer having an unsupported free discharge end, an undershot endless conveyer hinged on said elevator housing having a vertically extended forward portion disposed closely adjacent the discharge end of the auger conveyer with said undershot conveyer disposed in overlapped relation to the free end of said auger conveyer, said forward portion normally disposed generally upright in back of the auger conveyer, and means mounting the undershot conveyer enabling it to float under increased increments of crop material and to assume a position wherein a forward portion of the undershot conveyer becomes disposed vertically over the discharge end of the auger conveyer.

13. In a harvester having a transverse platform, a pair of auger conveyers disposed thereabove to move cut crops toward the center thereof, an elevator housing positioned adjacent the discharge ends of the auger conveyers, and a hinged undershot endless conveyer on said elevator housing having a vertically extended forward portion disposed closely adjacent the discharge ends of the auger conveyers to pull crop material therefrom, said extended forward portion having an extent exceeding the diameter of the auger conveyers.

14. In a harvester having a transverse platform, a pair of auger conveyers disposed thereabove to move cut crops toward the center thereof, an elevator housing positioned adjacent the discharge ends of the auger conveyers, said auger conveyers having unsupported free discharge ends, a hinged undershot endless conveyer on said elevator housing having a vertically extended forward portion disposed closely adjacent the discharge ends of the auger conveyers with said undershot conveyer disposed in overlapped relation to the free ends of said auger conveyers, said forward portion normally disposed generally upright in back of the auger conveyers, and means mounting the undershot conveyer enabling it to float under increased increments of crop material and to assume a position wherein a forward portion of the undershot conveyer becomes disposed vertically over the discharge ends of the auger conveyers.

STUART D. POOL.
ELMER O. ENGVALL.

REFERENCES CITED

The following references are of record in the file of this patent:

UNITED STATES PATENTS

| Number | Name | Date |
|---|---|---|
| 226,985 | Deane | Apr. 27, 1880 |
| 1,624,703 | Witte | Apr. 12, 1927 |
| 1,764,084 | Nelson et al. | June 17, 1930 |
| 1,934,160 | Ballentine et al. | Nov. 7, 1933 |
| 2,234,465 | Carroll | Mar. 11, 1941 |
| 2,292,958 | Millard et al. | Aug. 11, 1942 |
| 2,332,025 | Stone et al. | Oct. 19, 1943 |